(12) United States Patent
Haller et al.

(10) Patent No.: US 11,299,307 B2
(45) Date of Patent: Apr. 12, 2022

(54) TRANSFER UNIT AND METHOD FOR TRANSFERRING BLISTER PACKS

(71) Applicant: Uhlmann Pac-Systeme GmbH & Co. KG, Laupheim (DE)

(72) Inventors: Thomas Haller, Waldburg (DE); Bernd Haehnel, Stutensee (DE)

(73) Assignee: UHLMANN PAC-SYSTEME GMBH & CO. KG, Laupheim (DE)

( * ) Notice: Subject to any disclaimer, the term of this patent is extended or adjusted under 35 U.S.C. 154(b) by 125 days.

(21) Appl. No.: 16/377,932

(22) Filed: Apr. 8, 2019

(65) Prior Publication Data

US 2019/0322399 A1  Oct. 24, 2019

(30) Foreign Application Priority Data

Apr. 23, 2018 (EP) ..................................... 18168660

(51) Int. Cl.
| | | |
|---|---|---|
| *B65B 35/00* | (2006.01) | |
| *B65B 35/58* | (2006.01) | |
| *B65B 35/38* | (2006.01) | |
| *B65B 35/44* | (2006.01) | |
| *B65G 47/91* | (2006.01) | |

(52) U.S. Cl.
CPC .............. *B65B 35/58* (2013.01); *B65B 35/38* (2013.01); *B65B 35/44* (2013.01); *B65G 47/918* (2013.01)

(58) Field of Classification Search
CPC ......... B65B 5/103; B65B 35/18; B65B 35/38; B65G 47/914; B65G 47/918
See application file for complete search history.

(56) References Cited

U.S. PATENT DOCUMENTS

| | | | | |
|---|---|---|---|---|
| 5,564,888 A | * | 10/1996 | Doan ................... | B65G 47/902 414/738 |
| 5,862,646 A | * | 1/1999 | Orillo ....................... | B65B 5/08 198/345.1 |
| 6,922,977 B2 | * | 8/2005 | Agostini ................. | B65B 43/44 53/202 |

(Continued)

FOREIGN PATENT DOCUMENTS

| | | | |
|---|---|---|---|
| CA | 2560449 A1 | * 10/2005 | ............. B65B 35/38 |
| DE | 10 2004 043332 A1 | 3/2006 | |

(Continued)

OTHER PUBLICATIONS

International Search Report for European Application No. 18168660. 1, dated Sep. 27, 2018, 5 pgs.

*Primary Examiner* — Eyamindae C Jallow
(74) *Attorney, Agent, or Firm* — Dickinson Wright PLLC (57) ABSTRACT

Blister packs in a first and a second pick position are arranged one behind the other in a longitudinal row, which is parallel to a longitudinal center plane of the transfer unit and which extends in an area of the longitudinal center plane. The first blister pack in the first pick position is picked, moved, and placed in the first place position from above. The second blister pack in the second pick position is also picked, moved, and placed in the second place position from above. The blister packs in the first and second place positions are arranged with a lateral offset relative to the longitudinal center plane, and the blister packs in the first and second place positions are rotated 180° around their centers in comparison to their orientation in the first and second pick positions.

13 Claims, 10 Drawing Sheets

(56) References Cited

U.S. PATENT DOCUMENTS

| | | | | |
|---|---|---|---|---|
| 7,644,558 B1 * | 1/2010 | Fallas | ................... | B25J 9/0093 |
| | | | | 53/251 |
| 7,690,498 B2 * | 4/2010 | Hahnel | ............... | B65G 47/918 |
| | | | | 198/476.1 |
| 7,934,355 B2 * | 5/2011 | Strub | ..................... | B65B 5/103 |
| | | | | 53/55 |
| 2007/0251804 A1 * | 11/2007 | Hahnel | ............... | B65G 47/918 |
| | | | | 198/469.1 |
| 2015/0056046 A1 | 2/2015 | Haehnel et al. | | |

FOREIGN PATENT DOCUMENTS

| | | | | |
|---|---|---|---|---|
| DE | 10 2006 047925 A1 | | 4/2008 | |
| EP | 2 840 030 A1 | | 2/2015 | |
| EP | 3575228 A1 * | 12/2019 | ............ | B65B 35/38 |
| WO | WO 2014/181307 A1 | | 11/2014 | |

* cited by examiner

TRANSFER UNIT AND METHOD FOR TRANSFERRING BLISTER PACKS

RELATED APPLICATIONS

This application claims priority to European Patent Application No. 18 168 660.1, filed on Apr. 23, 2018, entitled "Transfer Unit And Method For Transferring Blister Packs", the contents of which are incorporated herein by reference in their entirety.

FIELD

The present disclosure relates to a transfer unit and a method for transferring blister packs.

BACKGROUND

Blister packs are frequently used in the pharmaceutical industry for the packaging of medications. A plurality of pockets, into which products such as sugar-coated pills or tablets but also syringes, vials, ampoules, etc. are introduced, are first formed in a film web. After the pockets have been filled, the film web can be sealed with a lidding foil, It is then sent to a stamping station, in which the individual blister packs are stamped out from the film web.

In another phase of the packaging process, the stamped-out blister packs are transferred to a conveying means by the use of a transfer device. The blister packs are placed in receptacles of the conveying means. Then the stacks of blister packs arranged on the conveying means are sent to a packaging station, where the stacks of blister packs are introduced into appropriate packaging. The time which the transfer device requires to transfer blister packs from the stamping station to the conveying means logically has an influence on the throughput of the overall packaging machine.

BRIEF SUMMARY

The present disclosure provides an improved transfer unit and method for transferring blister packs, wherein the transfer of the blister packs proceeds with an especially high degree of efficiency, precision, and speed.

According to an aspect of the present disclosure, the transfer unit for transferring blister packs comprises a first transfer arm, which can be moved between a first picking position, in which it can pick a first blister pack from a first pick position, and a first placing position, in which it can place the first blister pack in a first place position, and a second transfer arm, which can be moved between a second picking position, in which it can pick a second blister pack from a second pick position, and a second placing position, in which it can place the second blister pack in a second place position. The first and second transfer arms are arranged on either side of a longitudinal center plane of the transfer unit. Each transfer arm comprises a first segment and a second segment, wherein the first segment of each transfer arm is mounted so that it can rotate around an associated first axis, which is perpendicular to the longitudinal center plane. The first segment of each transfer arm comprises a section to which the second segment is attached so that it can rotate around a non-stationary second axis, which is substantially perpendicular to the associated first axis; wherein a retaining element for picking and holding a blister pack is arranged on the second segment. The transfer arms are configured and actuated in such a way that the movement of the transfer arms from the first or second picking position to the first or second placing position and back is a combined movement, which consists at least of a first rotational movement of the first segment and of the second segment around the first axis and a second rotational movement of the second segment around the second axis. The first and second pick positions are arranged one behind the other in a longitudinal row in the area of the longitudinal center plane, and the first and second place positions are arranged with an outward offset relative to the longitudinal center plane. The second axis of the first transfer arm is arranged in such a way that, during the first rotational movement of the first segment of the first transfer arm, the second axis of the first transfer arm moves in a first plane, which intersects the pick position or its lateral projection along a first straight line, which is laterally offset from the center of the first pick position. The second axis of the second transfer arm is arranged in such a way that, during the first rotational movement of the first segment of the second transfer arm, the second axis of the second transfer arm moves in a second plane, which intersects the second pick position or its lateral projection along a second straight line, which is laterally offset from the center of the second pick position.

This guarantees a reliable transfer of the blister packs, during which a single file of blister packs is split into two files in a simple manner and with high throughput.

The first axes of the first and second transfer arms are preferably parallel to each other but arranged a certain distance apart in the longitudinal direction. It is also preferred that the retaining element of each transfer arm comprise at least one retaining head, and also that the distance between the at least one retaining head of the first transfer arm and the first axis of the first transfer arm be greater than the distance between the at least one retaining head of the second transfer arm and the first axis of the second transfer arm. This makes it possible to compensate for the longitudinal offset of the blister packs during the transfer.

In this context it is advantageous for the first pick position to be farther away in the longitudinal direction from the first and second place positions than the second pick position; for the first axis of the first transfer arm to be arranged in the center, in the longitudinal direction, between the first pick position and the first place position; and for the first axis of the second transfer arm to be arranged in the center, in the longitudinal direction, between the second pick position and the second place position.

The transfer arms are preferably configured and actuated in such a way that the blister packs in the first and second pick positions are picked from above by the retaining elements of the first and second transfer arms and also placed from above in the place positions. Because the blister packs are picked from above, the blister packs can lie flat in the pick positions. The placing of the blister packs in the place positions from above guarantees the most flexible possible release time of the blister packs by the retaining elements.

It is preferred that the second segment of the first or second transfer arm, when in the first or second picking position, be pivoted inward relative to the longitudinal center plane, and that the second segment of the first or second transfer arm, when in the first or second placing position, be pivoted outward relative to the longitudinal center plane. As a result of this configuration, the lateral offset of the blister packs during transfer is realized by simple structural means.

It is advantageous for the second segments and thus the blister packs held by the retaining elements to execute a rotational movement of substantially 180° around the associated second axis when the transfer arms move from the first or second picking position to the first or second placing position or vice versa. This rotational movement represents a simple way of ensuring that the blister packs rotate 180° around their centers as they are being transferred. This guarantees in turn that the blister packs can be placed with their lidding foil side or open side facing up.

The first segments preferably execute a rotational movement of 60-180°, preferably of 120-180°, around the associated first axis when the transfer arms move from the first or second picking position to the first or second placing position or vice versa. Whereas the place positions are usually arranged horizontally, the pick positions can be arranged horizontally, vertically, or even at a certain angle. The above-cited range of angles covers all possible arrangements of the pick positions. It is also conceivable that the retaining elements could project at a slant from the second segment of the transfer arms, with the result that the angle around which the first segment would have to pivot could be smaller than the angle around which the blister packs must travel from the pick positions to the place positions.

The first and second transfer arms are actuated in such a way that the first and second transfer arms execute opposite back-and-forth pivoting movements. This makes it possible to increase the throughput of the transfer unit.

So that adaptations can be made to different formats of the blister packs and to different desired lateral offsets of the blister packs during transfer, the transfer arms can be supported so that they can be shifted in a direction parallel to the associated first axis.

It is preferred that the retaining element of each transfer arm comprise a least one retaining head, which is attached to the second segment by means of at least one support arm. It is especially preferred that the at least one support arm be rigidly attached to the second segment.

According to another aspect of the present disclosure, the method for transferring blister packs from a first and a second pick position to a first and a second place position by means of a transfer unit comprises the following steps:
  providing a first and a second blister pack in a first and a second pick position, wherein the blister packs in the first and second pick positions are arranged one behind the other in a longitudinal row, which is parallel to a longitudinal center plane of the transfer unit and which extends in the area of the longitudinal center plane;
  picking the first blister pack in the first pick position, moving the first blister pack, and placing the first blister pack in the first place position; wherein the first blister pack is placed in the first place position from above; wherein the first blister pack in the first place position is arranged with an outward offset relative to the longitudinal center plane; and wherein the first blister pack in the first place position is placed with a 180° rotation around its center in comparison to its orientation in the first pick position; and
  picking the second blister pack in the second pick position, moving the second blister pack, and placing the second blister pack in the second place position; wherein the second blister pack is placed in the second place position from above; wherein the second blister pack in the second place position is arranged with an outward offset relative to the longitudinal center plane; and wherein the second blister pack in the second place position is placed with a 180° rotation around its center in comparison to its orientation in the second pick position.

This guarantees a reliable transfer of the blister packs, during which a single file of blister packs is split into two files in a simple manner and with high throughput.

The blister packs in the first and second pick positions are preferably picked from above, and the blister packs are arranged in the first and second pick positions and in the first and second place positions with the same facing up in each case. These measures facilitate the picking and the placing of the blister packs. It is also possible in this way to use retaining elements in the transfer unit to pick and hold the blister packs.

It is advantageous for the first and second blister packs to acquire opposite lateral offsets transverse to the longitudinal center plane as they move from the first and second pick positions to the first and second place positions. As a result, the lateral offset of each blister pack can be reduced to half the distance between the place positions.

DETAILED DESCRIPTION

Figure 1:
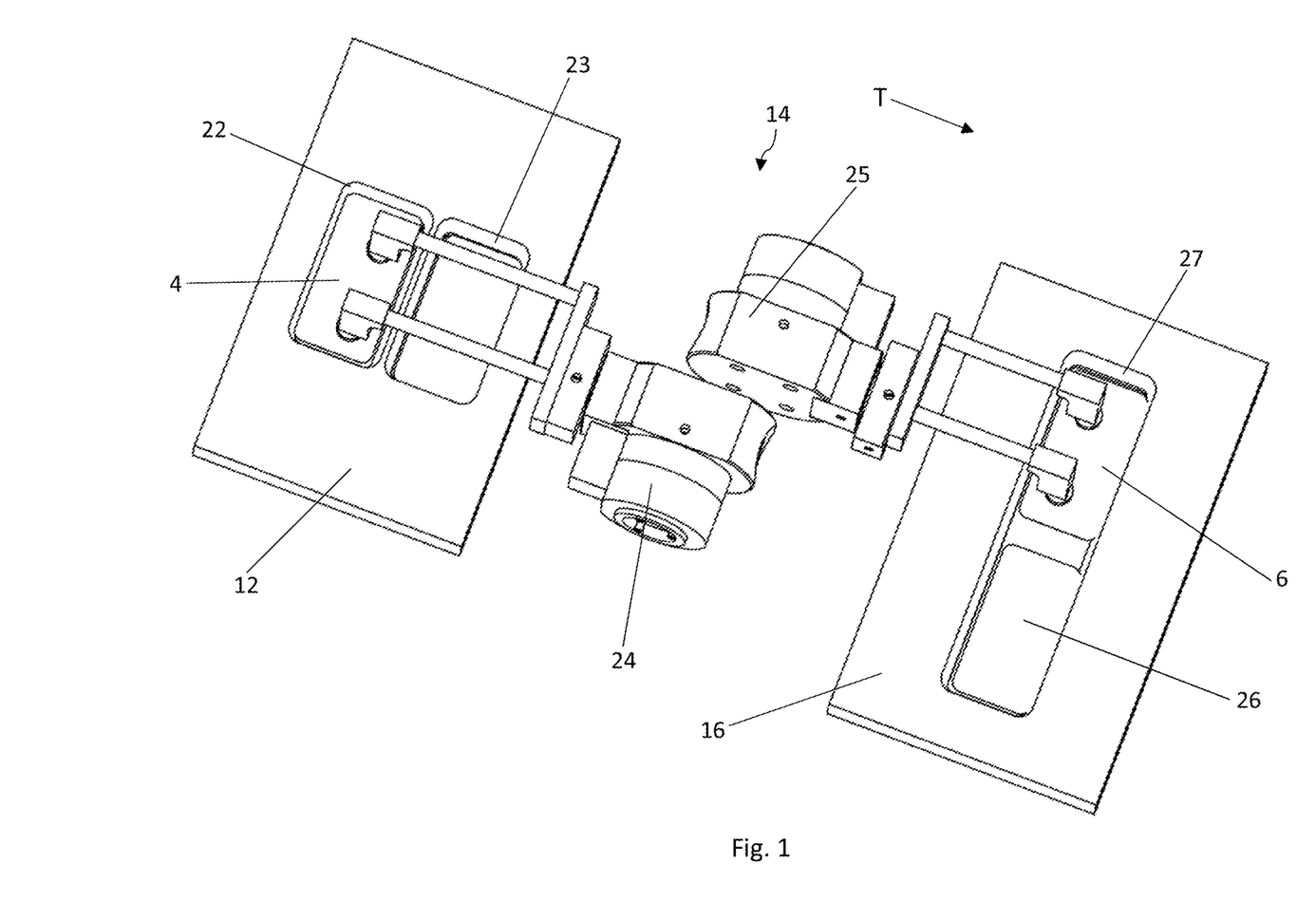
FIG. 1 is a schematic diagram, in perspective, of a transfer unit according to the present disclosure for transferring blister packs.
Figure 2:
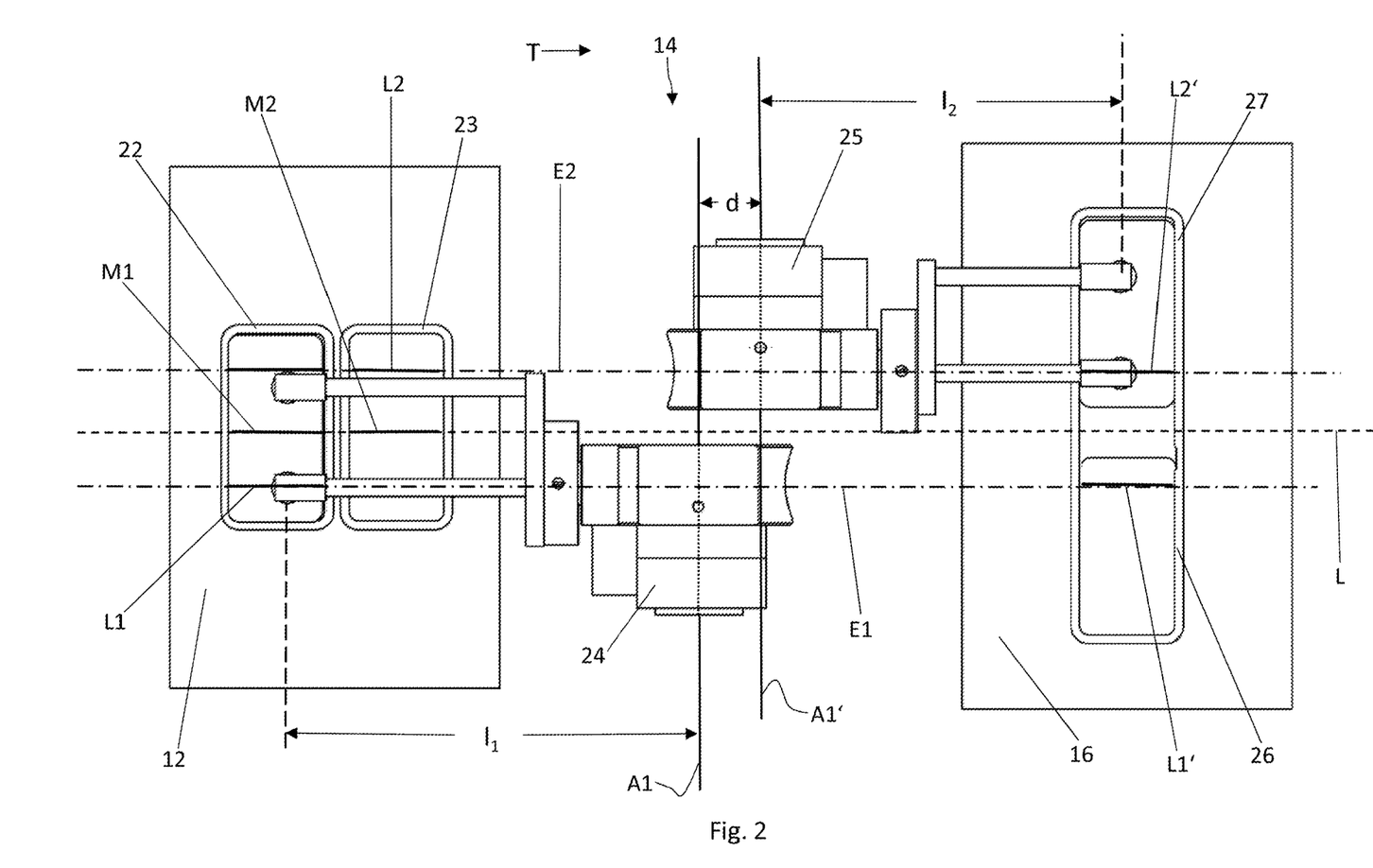
FIG. 2 is a top view of the transfer unit of FIG. 1.

FIGS. 1-6 show a transfer unit 14 for transferring blister packs 4, 6. The blister packs 4, 6 preferably contain medical products such as syringes, ampoules, vials, etc., but they can also contain tablets or other products. FIG. 1 and FIGS. 3-6 show the transfer unit 14 for transferring blister packs 4, 6 in various stages of the transfer process. FIG. 2 is a top view of the transfer unit 14.

The transfer unit 14 serves to transfer blister packs 4, 6 from an intermediate place element 12 to a conveying means 16. The transfer direction of the blister packs 4, 6 is indicated in the figures by the arrow T.

The intermediate place element 12, which can be either moving or nonmoving, and the conveying means 16 are illustrated merely schematically in the figures. The intermediate place element 12 is preferably a turntable. Instead of being on the intermediate place element 12, the pick positions 22, 23 of the blister packs 4, 6 can also be in a stamping station (not shown). It is also possible that a transport means (not shown) could be provided in the outlet area of the stamping station to transport the blister packs further onward after the stamping operation until they are gripped by the transfer unit 14. A transport means of this type preferably moves in stepwise fashion and in the transfer direction T.

The conveying means 16 preferably moves in the transfer direction T. The conveying means 16 can be configured as an endless packaging-goods chain, which is moved continuously or preferably in stepwise fashion. It is also conceivable that the conveying means 16 could be configured as a linear motor system. If the conveying means 16 is moved in stepwise fashion or if the individual slides of the endless linear motor system stand still during the transfer in the position at which the blister packs 4, 6 are supplied, stacks of two or more blister packs 4, 6, one lying on top of the other, can be formed in the compartments of the conveying means 16. It is also conceivable that the blister packs 4, 6 could be transferred initially to a storage area (not shown) rather than directly to the conveying means 16.

The transfer unit 14 according to the present disclosure comprises a first transfer arm 24 and a second transfer arm 25, which are arranged on either side of the longitudinal center plane L of the transfer unit 14. The first transfer arm 24 can be moved between a picking position (see FIG. 2), in which it can pick the first blister pack 4 from a first pick position 22, and a placing position (FIG. 4), in which it can place the first blister pack 4 in a first place position 26.

The second transfer arm 25 of the transfer unit 14 can be moved between a picking position (FIG. 4), in which it can pick the second blister pack 6 from a second pick position 23, and a placing position (see FIG. 2), in which it can place the second blister pack 6 in a second place position 27. The two place positions 26, 27 are arranged next to each other in a row transverse to the longitudinal center plane L and are laterally offset from the longitudinal center plane L in each case.

The two transfer arms 24, 25 are arranged and configured substantially with mirror symmetry to the longitudinal center plane L of the device 2. The two transfer arms 24, 25, however, are offset from each other in the longitudinal direction by a distance d, and the second transfer arm 25 is shorter than the first transfer arm 24. A more thorough description will be given below with reference to FIG. 2.

The two transfer arms 24, 25 execute opposite back-and-forth pivoting movements. When the first transfer arm 24 is in the picking position, the second transfer arm 25 is in its placing position or at least near its placing position. When the first transfer arm 24 is in the placing position, the second transfer arm 25 is in its picking position or at least near its picking position. The picking position of the first transfer arm 24 differs in terms of its physical configuration in space from the picking position of the second transfer arm 25. The placing position of the first transfer arm 24 also differs from the placing position of the second transfer arm 25.

The first and second pick positions 22, 24 and the first and second place positions 26, 27 are each preferably formed to accommodate the shape of the blister packs 4, 6 to be transferred. In the case of conventional blister packs 4, 6, the above-mentioned positions will therefore have a substantially rectangular shape. In the embodiment shown here, the above-cited positions are each arranged in such a way that the longer sides of the positions are transverse to the transfer direction T. As can be seen in FIG. 2, the first and second pick positions 22, 23, are arranged in the area of the longitudinal center plane L. In contrast, the first and second place positions 26, 27 are arranged with an outward offset relative to the longitudinal center plane L, preferably in an arrangement which is symmetrical to the longitudinal center plane L.

Details of the transfer unit 14 will now be described more thoroughly with reference to FIGS. 7-10. As can be derived from FIG. 7, the first transfer arm 24 comprises a first segment 30 and a second segment 31. The first segment 30 of the first transfer arm 24 is mounted so that it rotate around a first axis A1, which is perpendicular to the longitudinal center plane L. The first segment of the first transfer arm 24 comprises a section to which the second segment 31 is attached so that it can rotate around a non-stationary second axis A2, which is substantially perpendicular to the first axis A1. A retaining element 34 for picking and holding the blister pack 4 is arranged on the second segment 31.

Figure 7:
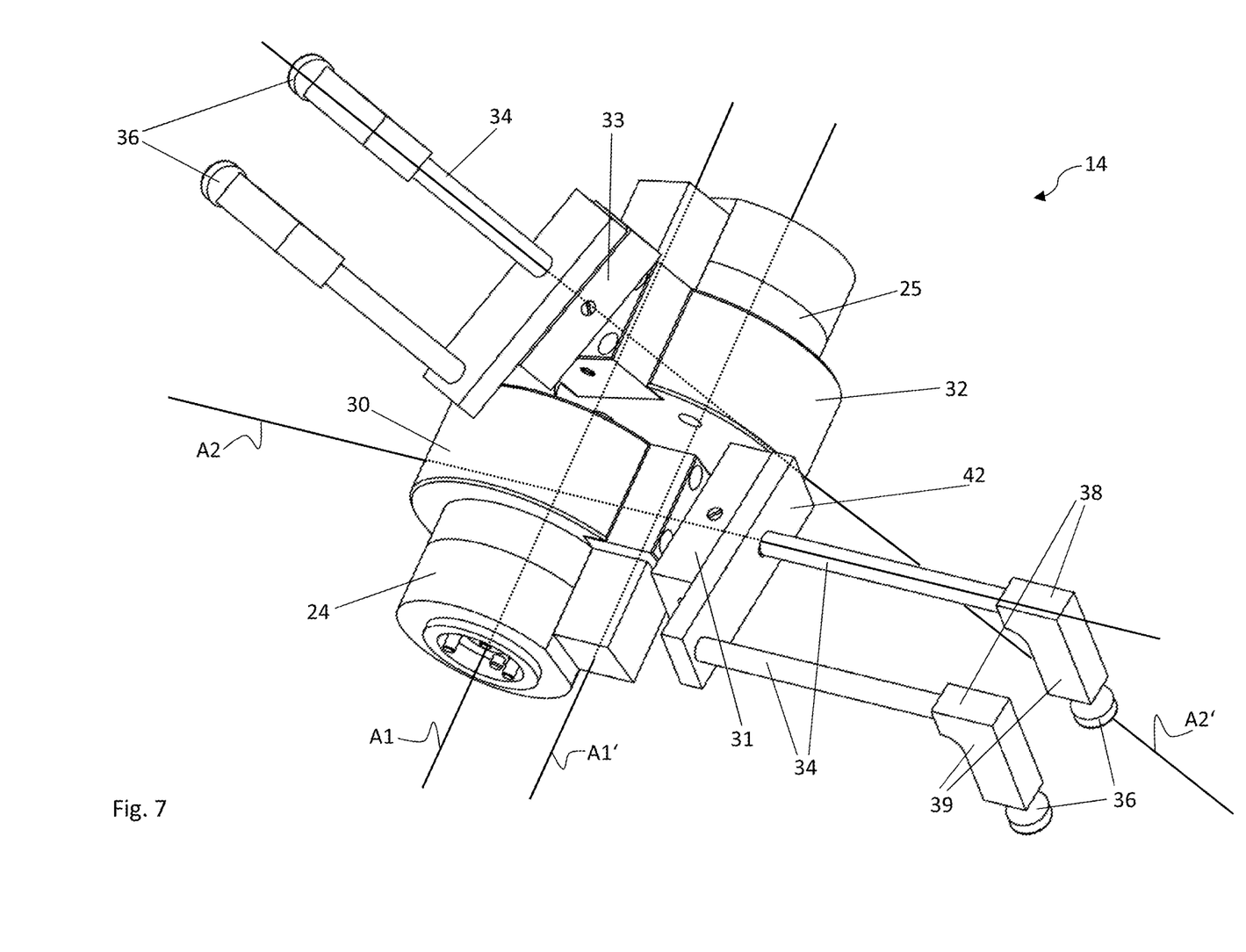
FIG. 7 is a schematic diagram, in perspective, of two transfer arms, which are used in the transfer unit according to FIG. 1.

The second transfer arm 25 also comprises a first segment 32 and a second segment 33. The first segment 32 of the second transfer arm 25 is mounted so that it can rotate around the first axis A1'. The first segment 32 of the second transfer arm 25 also comprises a section to which the second segment 33 is attached so that it can rotate around a non-stationary second axis A2', which is substantially perpendicular to the first axis A1'. A retaining element 34 for picking and holding a blister pack 6 is also arranged on the second segment 33.

The transfer arms 24, 25 are configured and actuated in such a way that the movement of the transfer arms 24, 25 from their picking positions to their placing positions and back is a combined movement, which consists at least of a first rotational movement of the first segment 30, 32 and of the second segment 31, 33 around the first axis A1, A1', and a second rotational movement of the second segment 31, 33 around the associated second axis A2, A2'.

As can be derived from FIG. 2, the second axis A2 of the first transfer arm 24 is arranged in such a way that that, during the first rotational movement around the first axis A1, it moves in a first plane E1, which intersects the first pick position or its lateral projection along a first straight line L1. This first straight line L1 is laterally offset from the center M1 of the first pick position 22. The lateral offset of this first straight line L1 proceeds from the center M1 of the first pick position 22 toward the outside.

The plane E1 also intersects the first place position 26 or its lateral projection along a straight line L1'. This straight line L1' is laterally offset from the center of the first place position 26.

The second axis A2' of the second transfer arm 25 is arranged in such a way that, during the first rotational movement of the second transfer arm 25 around the first axis A1', it moves in a second plane E2, which intersects the second pick position 23 or its lateral projection along a second straight line L2, which is laterally offset from the center M2 of the second pick positions 23. Here again, the lateral offset proceeds from the center M2 of the second pick position 23 toward the outside.

The plane E2 also intersects the second place position 27 or its lateral projection along a straight line L2'. This straight line L2' is laterally offset from the center of the second place position 27.

As shown in FIG. 7, the retaining element 34 of each transfer arm 24, 25 comprises several retaining heads 36, which are attached to the second segment 31, 33 by means of a support arm 38. It is also possible for only a single retaining head 36 to be present on each retaining element 34. If several retaining heads 36 are present, several separate support arms 38 for connecting the retaining element to the second segment 31, 33 can also be present. In the embodiment shown here, the support arm 38 is configured as a rake and comprises several fingers 39, on the tip of each of which a retaining head 36 is arranged. The support arm 38 is preferably attached rigidly to the second segment 31, 33. In the embodiment shown, the support arm 38 comprises a connecting member 42, which is connected to the second segment 31, 33. In the embodiment shown, the connecting member 42 of the support arm 38 is connected perpendicularly to the second segment 31, 33. It is also conceivable that the connecting member 42 and thus the support arm 38 could project at a slant from the second segment 31, 33. In the associated picking and placing positions of the transfer arms 24, 25, the support arm 38 would then project downward at a slant. As a result, the angle around which the individual support arm 24, 25 would be required to rotate around the first axis A1, A1' can be reduced.

As can be derived from FIGS. 2 and 7, the second segment 31, 33 of the first or second transfer arm 24, 25, when in the associated picking position, is pivoted inward relative to the longitudinal center plane L. In concrete terms, the section of the second segment 31, 33 to which the support arm 38 is attached is pivoted inward. It can also be seen that the second segment 31, 33 of the first or second transfer arm 24, 25—in concrete terms, the section of the second segment 31, 33 to which the support arm 38 is attached—is, when in the associated placing position, pivoted outward relative to the longitudinal center plane L.

The first place position 22 is farther away in the longitudinal direction from the first and second place positions 26, 27 than the second pick position 23. As can be derived from FIG. 2, the first axes A1, A1' of the first and second transfer arms 24, 25 are parallel to each other but are arranged at a certain distance d away from each other in the longitudinal direction. This distance d, in the embodiment shown here, is equal to half the longitudinal offset between the pick positions 22 and 23.

The first axis A1 of the first transfer arm 24 is arranged longitudinally in the middle between the first pick position 22 and the first place position 26, and the first axis A1' of the second transfer arm 25 is arranged longitudinally in the middle between the second pick position 23 and the second place position 27.

Accordingly, the distance I1 between the at least one retaining head 36 of the first transfer arm 24 and the first axis A1 of the first transfer arm 24 is greater than the distance I2 between the at least one retaining head 36 of the second transfer arm 25 and the first axis A1' of the second transfer arm 25.

Details of a possible drive for the transfer arm 24 will now be described on the basis of the FIGS. 8-10.

Figure 8:
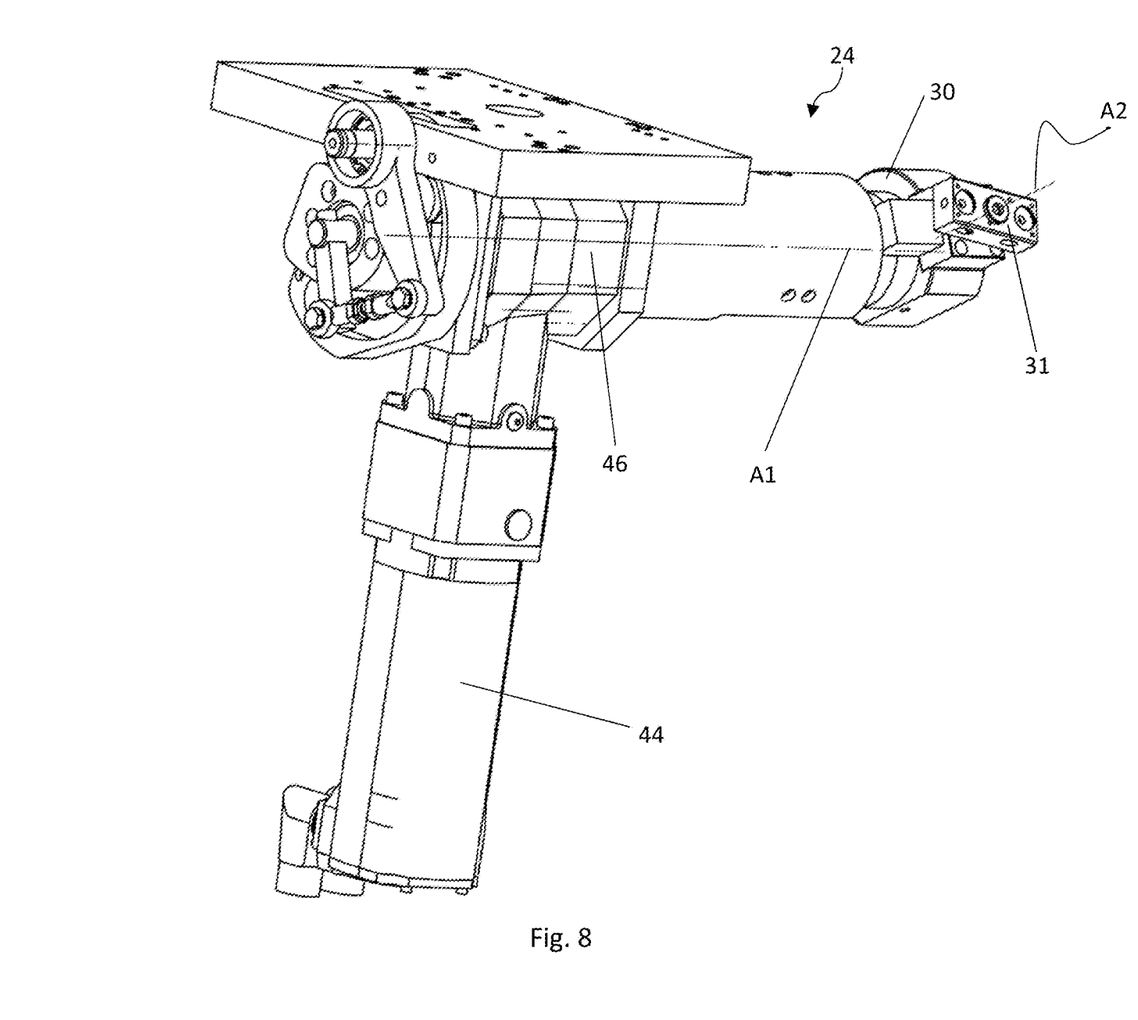
FIG. 8 is a schematic diagram, in perspective, of essential drive components of a transfer arm of FIG. 7.

In FIG. 8 a motor 44 can be seen, which pivots the first segment 30 back and forth around the first axis A1 by way of a gear unit 46. The second segment 31, which pivots around the second axis A2, is shown without the retaining element 34 attached to it. The retaining element 34 is preferably a format-dependent part, which can be exchanged depending on the type and size of the blister packs 4, 6 to be transferred. So that the support arm 38 of the retaining element 34 can be attached to, and detached from, the second segment 31, a knurled screw 48 (see FIG. 9) is preferably provided on the second segment 31. To allow for additional adaptations to different formats, the transfer arms 24, 25 can also be supported so that they can be shifted in a direction parallel to the first axis A1 and/or in the longitudinal direction.

Figure 9:
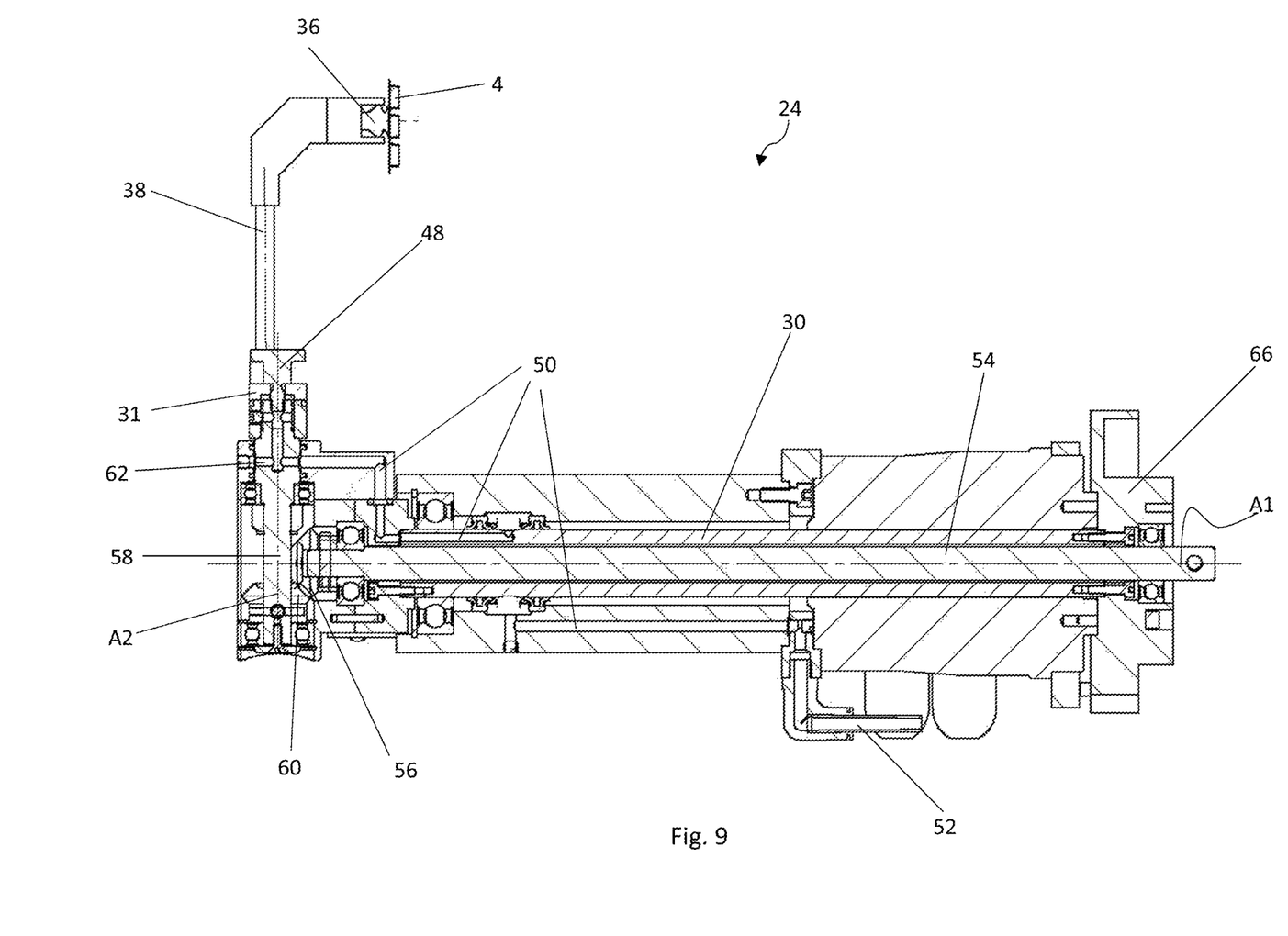
FIG. 9 is a cross-sectional view illustrating the internal structure of a transfer arm of FIG. 7.

The motor 44 and the gear unit 46 are not shown in the cross-sectional view of FIG. 9. The first segment 30 of the transfer arm 24, which is configured as a hollow shaft, is driven by the motor 44. When the motor 44 is actuated, the first segment 30 is pivoted back and forth around the first axis A1. The second segment 31 is supported in a section of the first segment so that it can rotate around the second axis A2. In the first segment 30, air channels 50 are provided, which are connected to a vacuum connector 52 for the retaining heads 36. In the interior of the first segment 30, furthermore, a shaft 54 is arranged, to one end of which, i.e., the end facing the second segment 31, a bevel gear 56 is rigidly attached.

The second segment 31 comprises a central shaft 58, which is supported rotatably in the end section of the first segment 30 and which, when the first segment rotates around the first axis A1, turns along with the first segment 30. Another bevel gear 60 is permanently connected to the shaft 58; when the first segment and the second segment 30, 31 rotate around the first axis A1, this bevel bear meshes with the bevel gear 56. An annular groove 62 in the shaft 58 serves to produce a connection with the air channels 50 in the first segment 39 even during a rotational movement of the second segment 31 around the second axis A2.

When the first segment 30 and thus also the second segment 31 are now pivoted around the first axis A1, the bevel gear 60 runs along the nonmoving bevel bear 56 and thus causes the shaft 68 to rotate around the second axis A2. At a ratio of 1:1 between the bevel gears 56, 60, therefore, a pivoting of 180° of the first segment 30 and of the second segment 31 around the first axis A1, as is desired for the transfer processes shown in FIGS. 1-6, also brings with it a rotation of the second segment 31 by 180° around the second axis A2. Thus the second segment 31 and the blister pack 4 held by the retaining element 34 execute a rotational movement around the second axis A2 of substantially 180° when the transfer arm 24 moves from its picking position to its placing position or vice versa. If the retaining element 34 in the picking position and in the placing position projects downward at a slant, the first segment 30, during the pivoting movement around the first axis A1, can travel around an angle of less than 180°, possibly of only 120°. In this case, the ratio between the bevel gears 56, 60 would have to be adapted accordingly, because the second segment 31 must complete a rotational movement of 180° around the second axis A2 in all cases.

The rotational movement of the second segment 31 around the second axis A2 in combination with the pivoting movement around the first axis A1 has the effect that the retaining head 36 can grip the blister pack 4 in question on one side, preferably on the flat surface of the lidding foil side, and can then place the blister pack from above in the place position 26. As this is happening, the blister pack 4 completes a 180° rotation around its center.

In a departure from the basic principle described so far, it is desirable for the second segment 31 not to execute any rotational movement around the second axis A2 in the end phases of the pivoting movement around the first axis A1. The reason for this is that, for the purpose of an effective picking and placing of the blister packs 4, it is advantageous for the blister packs 4 to be raised and lowered in a straight line in the end phases of their movement. To achieve this purpose, a mechanism 64 for adapting the course of the rotation of the second segment 31 around the second axis A2 can be provided in the second transfer unit 14.

This mechanism 64 will now be described in detail with reference to FIG. 10. In FIG. 10, the end of the first segment 30, to which the second segment 31 and the retaining element 34 are attached, is not shown for the sake of clarity. The mechanism 64 comprises a cam disk 66, which rotates around the first axis A1 jointly with the first segment 30. This cam disk 66 is also shown in the cross-sectional view of FIG. 9 but without the additional components of the mechanism 64.

Figure 10:
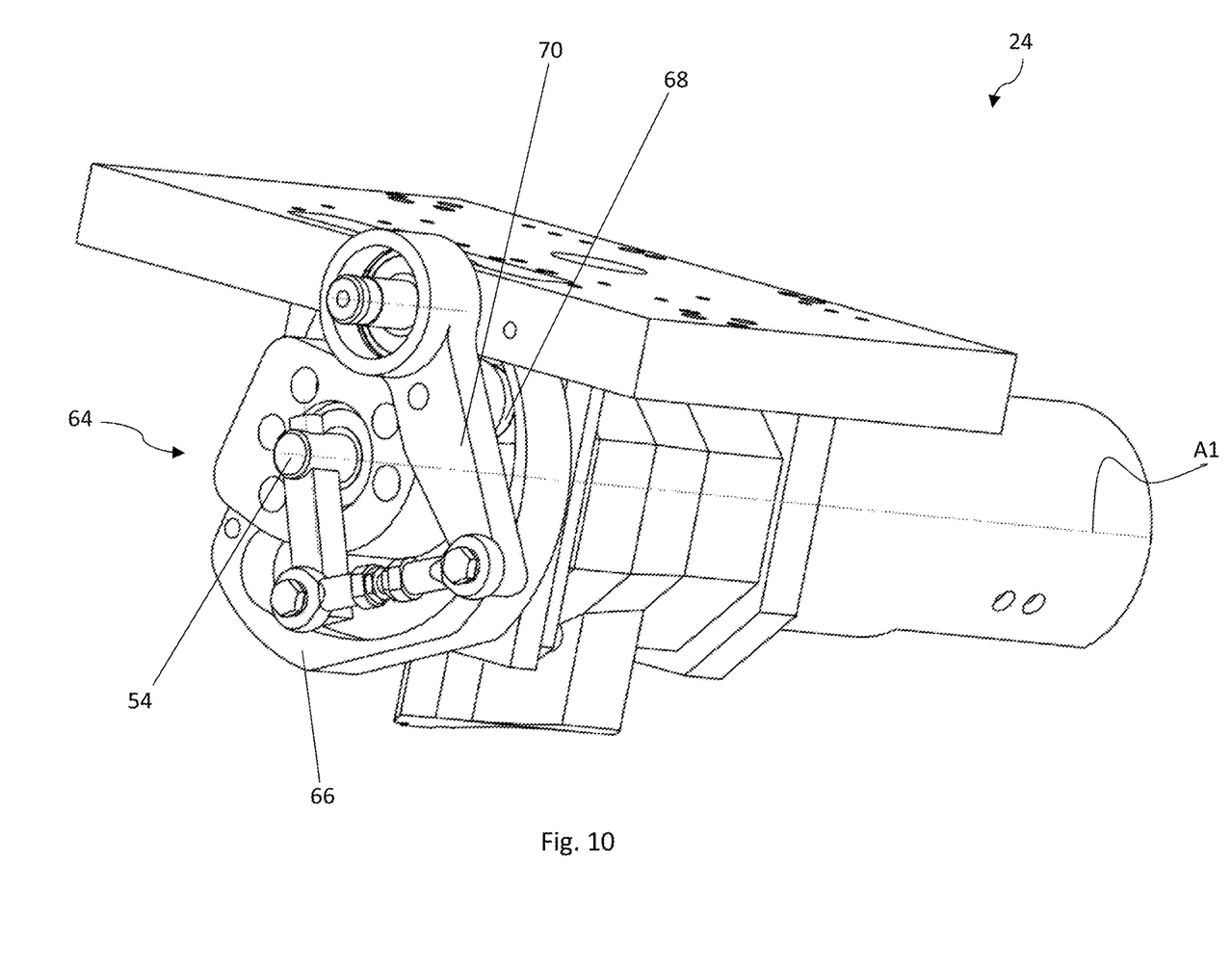
FIG. 10 is a schematic diagram, in perspective, of a mechanism for adapting the rotational movement of the second segment of the transfer arm of FIG. 9 around the second axis.

As shown in FIG. 10, the mechanism 64 also comprises a cam roller 68, which is articulated rotatably to a lever mechanism 70. The lever mechanism 70 is rigidly connected in turn to an internal shaft 54, on the other end of which the bevel gear 56 is arranged. When the cam disk 66 rotates around the first axis A1, the cam roller 68 runs along the cam disk 66 and thus brings about a corresponding deflection of the lever mechanism 70, which leads in turn to a rotation of the shaft 54 around the first axis A1. The mechanism 64 is configured in such a way that, during the beginning and end phases of the rotational movement of the first segment 30 and thus of the cam disk 66 around the first axis A1, the shaft 54 and thus the bevel gear 56 move along at the same angular velocity as the first segment 30. As a result, there is no relative movement between the bevel gear 56 and bevel gear 60, which means that no rotational movement of the second segment 31 around the second axis A2 is initiated.

During the further course of the pivoting movement around the first axis A1, however, the mechanism 64 causes the shaft 54 to move in a direction opposite the rotational direction of the first segment 30, as a result of which the rotational speed of the second segment 31 around the second axis A2 is faster in a certain phase than the rotational movement around the first axis A1. It is thus possible to suspend the rotational movement of the second segment 31 around the second axis A2 in the end phases of the pivoting movement around the first axis A1 and to compensate for this in a middle phase of the pivoting movement around the first axis A1 by a more rapid rotation of the second segment 31 around the second axis A2. This guarantees that the blister packs 4 will always complete a rotational movement of 180° around the second axis A2.

There are, of course, many possible ways to modify the structure of the transfer arm 24 and the associated drive described so far. For example, the coupling between the pivoting movement of the first segment 30 around the first axis A1 and the rotational movement of the second segment 31 around the second axis A2 could also be achieved by means of different mechanical components. It is also conceivable that two separate servo motors could be provided, one to drive the first segment 30, the other to drive the second segment 31.

The structure of the transfer arm 25 is substantially mirror-symmetric to that of the transfer arm 24, wherein the first segment carries the designation 32, the second segment the designation 33, the first axis the designation A1', and the second axis the designation A2'.

The sequence of steps of a transfer process with the transfer unit 14 described above will now be explained in greater detail on the basis of FIGS. 1-6.

The blister pack 4 located in the first pick position 22 is gripped by the first transfer arm 24 and transferred to the first place position 26. The first blister pack 4 in the first pick position 22 is picked from above and also placed from above in the first place position 26. The first blister pack 4 in the first pick position 22 is arranged in the area of the longitudinal center plane L, and, in the first place position 26, it is arranged with an outward offset relative to the longitudinal center plane L. The first blister pack 4 is placed in the first place position 26 with the same side facing up as it did in the first place position 22 but now with a rotation of 180° around its center.

Figure 3:
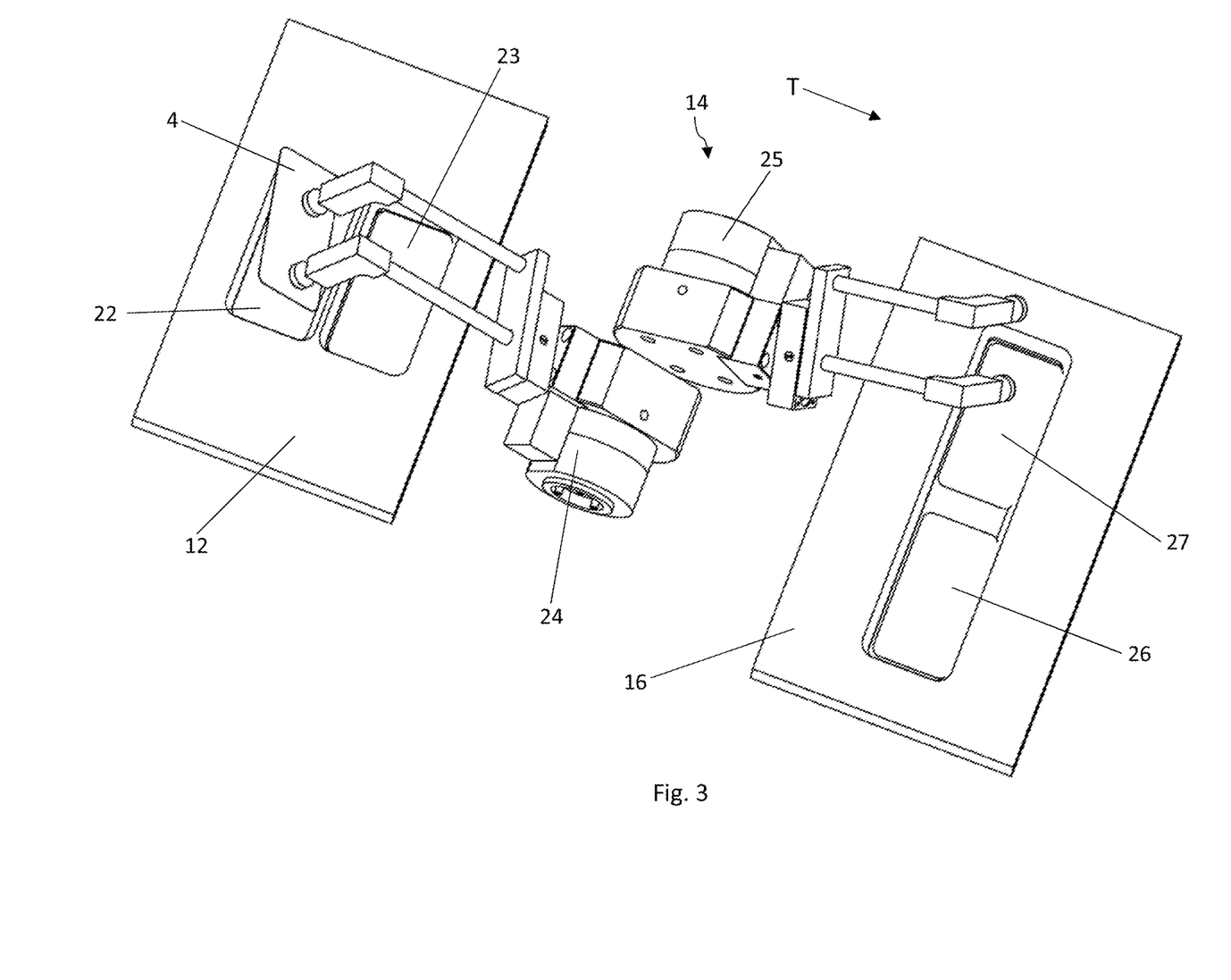
FIGS. 3-6 are schematic diagrams, in perspective, of the transfer unit of FIG. 1, showing various stages of the transfer process.
Figure 4:
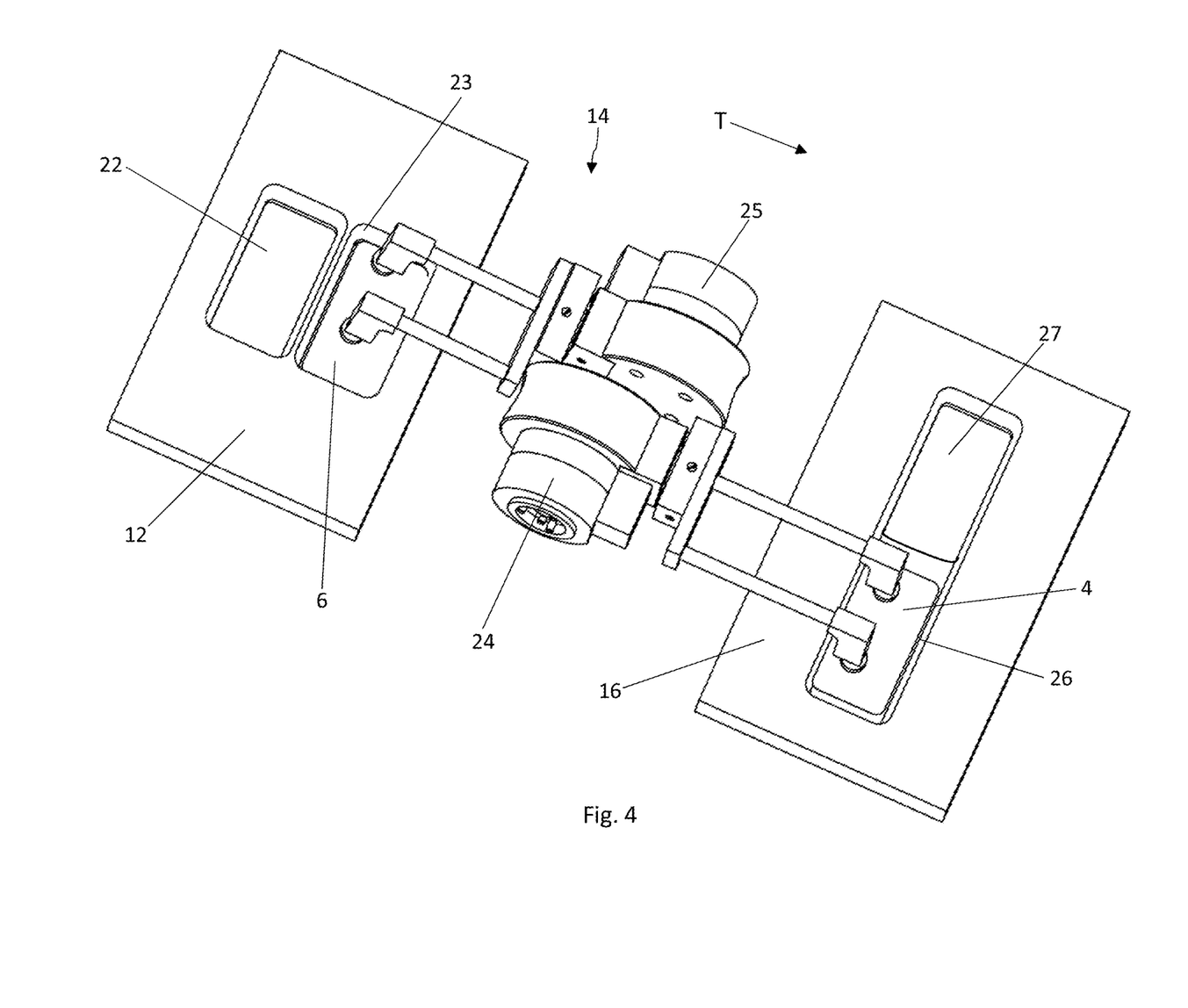
Figure 5:
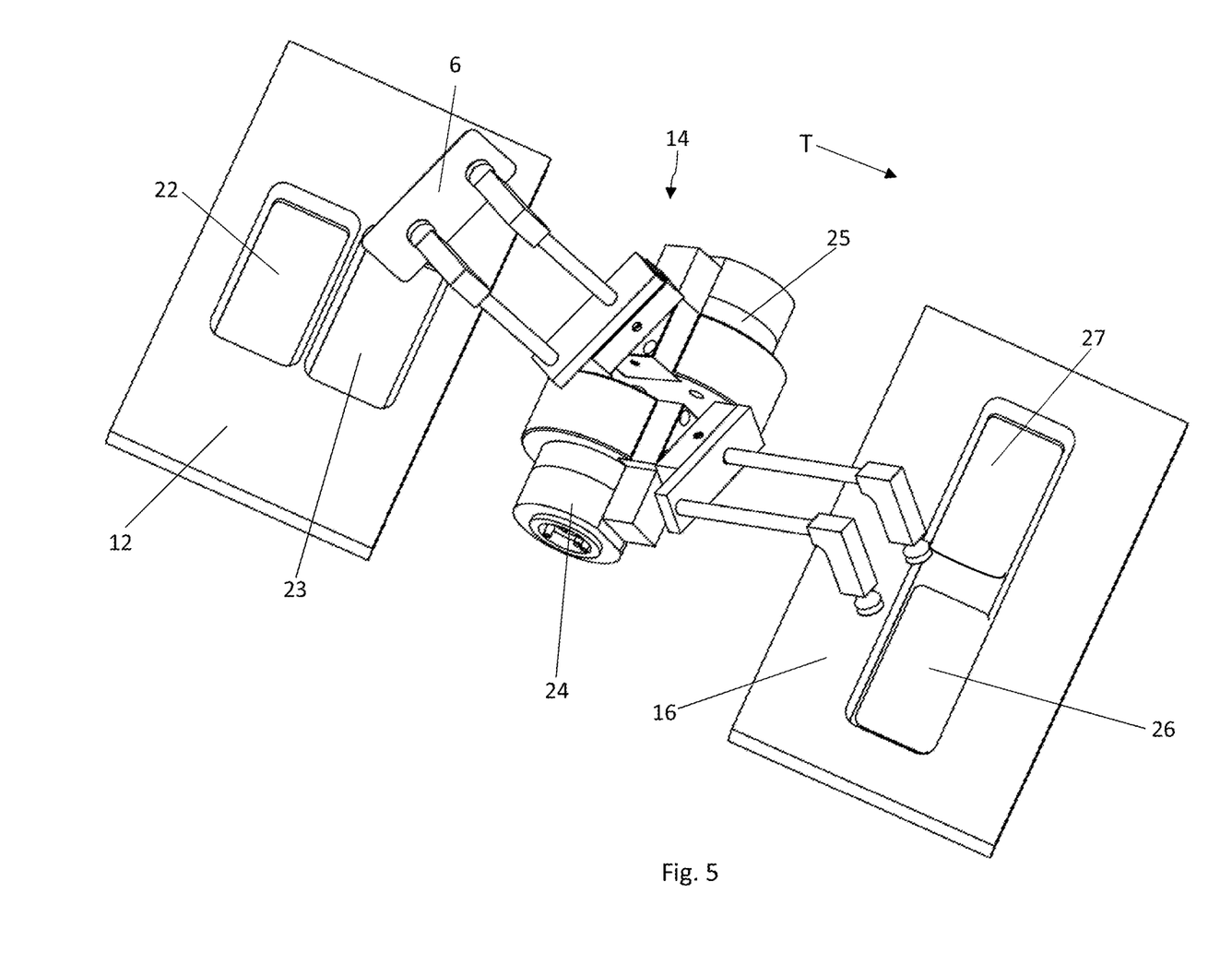
Figure 6:
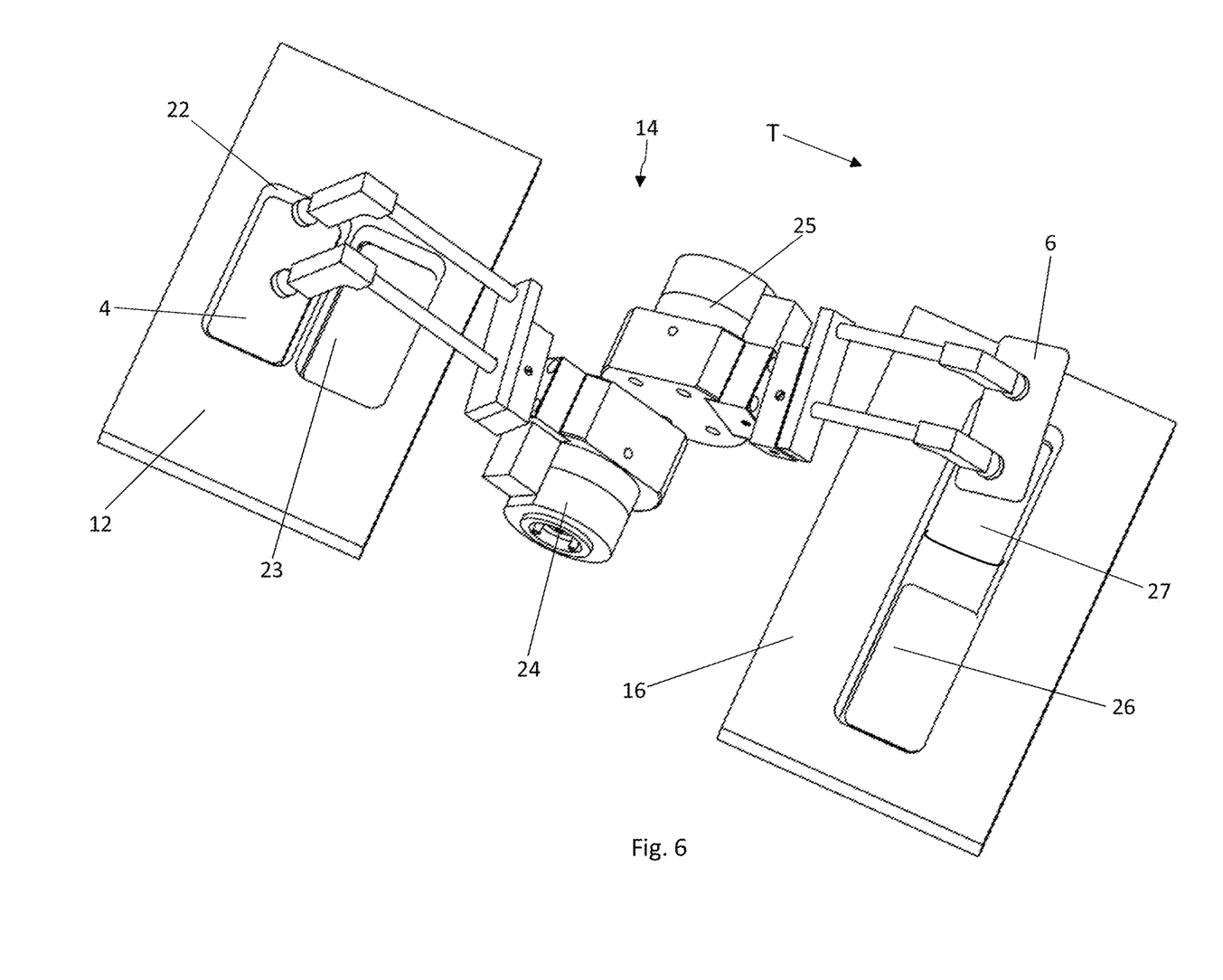

FIG. 1 shows the first blister pack 4 as it is being gripped in the first pick position 22. In FIG. 3, the first blister pack 4 is on the way from the first pick position 22 to the first place position 26, where it is placed at the time shown in FIG. 4. In FIG. 5, the first transfer arm 24 is shown shortly after the placing step, and it is already on its return journey to its picking position. Shortly after the time shown in FIG. 6, the cycle begins again from the beginning. The process is repeated as often as desired.

Concerning the transfer of the second blister pack 6 from the second pick position 23 to the second place position 27 by means of the second transfer arm 25, what was said above concerning the transfer of the first blister pack 4 by means of the first transfer arm 24 applies here also in exactly the same way. The only difference is that the times at which the blister pack 6 is picked and at which the blister pack 6 is placed are substantially opposite to the times at which the first blister pack 4 is picked and placed. The two transfer arms 24, 25 complete a pivoting movement in the same rotational direction around different first axes A1, A1', whereas the rotational movements of their second segments 31, 33 around their associated second axes A2, A2' proceed in opposite rotational directions. At the vertex of the rotational movement, as shown in the cross-sectional view of FIG. 9, the blister packs are preferably parallel to the longitudinal center plane L.

As a result of the combined rotational movements around the two axes, which are perpendicular to each other, the blister packs 4, 6 in the place positions 26, 27 have the same side facing up as they did in the pick positions 22, 23 but have now been placed with a 180° rotation around their centers. Under certain conditions it is also possible that the blister packs 4, 6 could not be oriented horizontally in the pick positions 22, 23 but could rather, for example, be oriented vertically or even at an angle to the vertical. In this case, the transfer arms 24, 25 complete a pivoting movement around the associated first axis by an angle of less than 180°, usually by an angle of 60-180°.

The blister packs 4, 6 are usually sealed with a flat lidding foil, on which the retaining heads 36 can act. In this case, the heads can be preferably configured as suction heads. It is also conceivable, however, that the blister packs 4, 6 could remain open at the top. In this case, it is advantageous for the suction heads 36 to be adapted to the shape of the product and to grip the products held in the blister pockets directly.

Alternatively, gripping heads with grippers as retaining heads could also be used. This is an effective option for especially heavy products or in the case of blister packs 4, 6 open at the top. In this case, there is no need for an air supply to the retaining heads 36, as was described above with reference to FIG. 9.

In addition to the embodiment described above, it is also conceivable that the transfer unit 14 could implement the reverse process; i.e., the blister packs 4, 6 could be picked in the positions 26, 27 and placed in the positions 22, 23.

The invention claimed is:

1. A transfer unit for transferring blister packs comprising:
a first transfer arm, which is movable between a first picking position, in which the first transfer arm picks a first blister pack from a first pick position, and a first placing position, in which the first transfer arm places the first blister pack in a first place position; and
a second transfer arm, which is movable between a second picking position, in which the second transfer arm picks a second blister pack from a second pick position, and a second placing position, in which the second transfer arm places the second blister pack in a second place position;
wherein the first and second transfer arms are arranged on either side of a longitudinal center plane of the transfer unit;

wherein each of the first and second transfer arms comprises a first segment and a second segment, wherein the first segment is mounted rotatably around an associated first axis, which is perpendicular to the longitudinal center plane;

wherein the first segment of each of the first and second transfer arms comprises a section to which the second transfer arm is attached such that it rotates around a non-stationary second axis, which is substantially perpendicular to the associated first axis, wherein a retaining element for picking and holding a blister pack is arranged on the second segment;

wherein the first and second transfer arms are configured and actuated such that a movement of one of the first and second transfer arms from the first or second picking position to the first or second placing position and back is a combined movement, which comprises at least a first rotational movement of the first segment and of the second segment around the first axis and a second rotational movement of the second segment around the second axis;

wherein the first and second pick positions are arranged one behind the other in a longitudinal row in an area of the longitudinal center plane, and the first and second place positions are outwardly offset relative to the longitudinal center plane;

wherein the second axis of the first transfer arm is arranged such that, during the first rotational movement of the first segment of the first transfer arm, the second axis of the first transfer arm moves in a first plane, which intersects the first pick position or a lateral projection thereof along a first straight line, which is laterally offset from a center of the first pick position; and wherein the second axis of the second transfer arm is arranged such that, during the first rotational movement of the first segment of the second transfer arm, the second axis of the second transfer arm moves in a second plane, which intersects the second pick position or a lateral projection thereof along a second straight line, which is laterally, offset from a center of the second pick position.

2. The transfer unit of claim 1, wherein the first axes of the first and second transfer arms are parallel to each other but are arranged a certain distance apart from each other.

3. The transfer unit of claim 1, wherein the retaining element of each of the first and second transfer arms comprises at least one retaining head, and wherein a distance of the at least one retaining head of the first transfer arm from the first axis of the first transfer arm is greater than a distance of the at least one retaining head of the second transfer arm from the first axis of the second transfer arm.

4. The transfer unit of claim 1, wherein the first pick position is farther away in a longitudinal direction from the first and second place positions than the second pick position, wherein the first axis of the first transfer arm is arranged longitudinally in a center between the first pick position and the first place position, and wherein the first axis of the second transfer arm is arranged longitudinally in a center between the second pick position and the second place position.

5. The transfer unit of claim 1, wherein the first and second transfer arms are configured and actuated such that the blister packs in the first and second pick positions are picked from above by the retaining elements of the first and second transfer arms and are also placed from above in the first and second place positions.

6. The transfer unit of claim 1, wherein the second segment of the first or second transfer arm, when in the first or second picking position, is pivoted inward relative to the longitudinal center plane, and wherein the second segment of the first or second transfer arm, when in the first or second placing position, is pivoted outward relative to the longitudinal center plane.

7. The transfer unit of claim 1, wherein the second segments and thus the blister packs held by the retaining elements execute a rotational movement of substantially 180° around the associated second axis when the transfer arms move from the first or second picking position to the first or second placing position or vice versa.

8. The transfer unit of claim 1, wherein the first segments execute a rotational movement of 60-180° around the associated first axis when the transfer arms move from the first or second picking position to the first or second placing position or vice versa.

9. The transfer unit of claim 1, wherein the first segments execute a rotational movement of 120-180° around the associated first axis when the transfer arms move from the first or second picking position to the first or second placing position or vice versa.

10. The transfer unit of claim 1, wherein the first and second transfer arms are actuated such that the first and second transfer arms execute opposite back-and-forth pivoting movements.

11. The transfer unit of claim 1, wherein the first and second transfer arms are supported shiftably in a direction parallel to the associated first axis.

12. The transfer unit of claim 1, wherein the retaining element of each transfer arm comprises at least one retaining head, which is attached to the second segment by means of at least one support arm.

13. The transfer unit of claim 12, wherein the at least one support arm is rigidly attached to the second segment.

* * * * *